D. R. CLOSE.
VEHICLE SPRING.
APPLICATION FILED JUNE 25, 1909.
963,870.
Patented July 12, 1910.
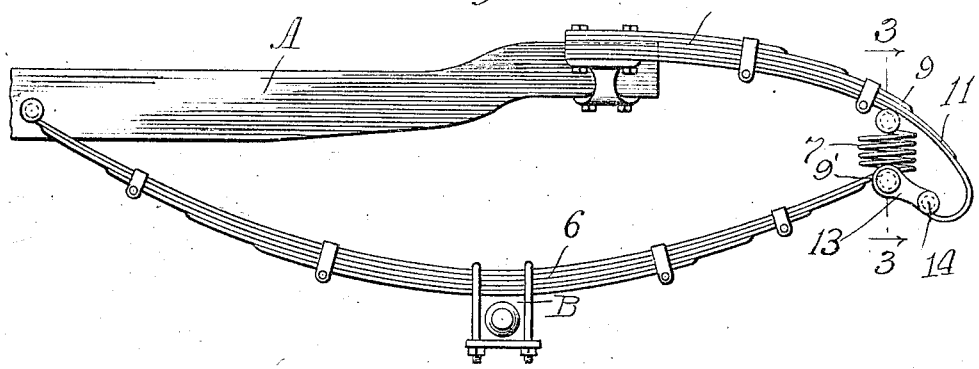
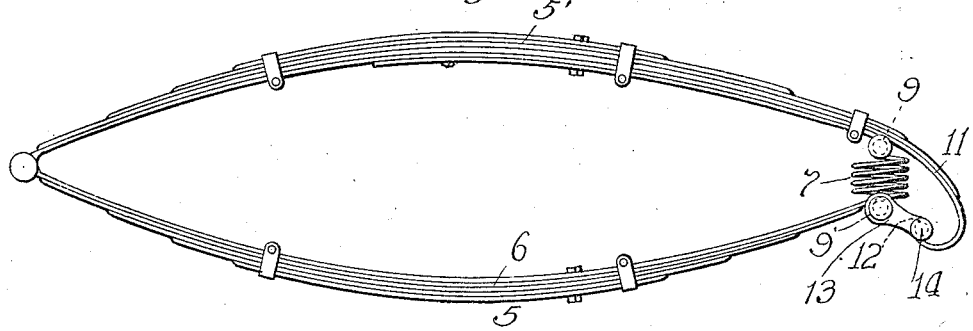
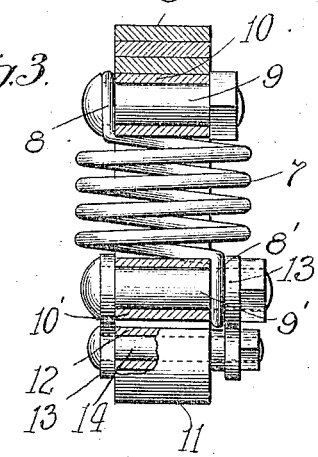
Witnesses
H. R. C. White
R. A. White
Inventor
Dorr R. Close
By Goree Dain and May Atty's

UNITED STATES PATENT OFFICE.

DORR R. CLOSE, OF CHICAGO, ILLINOIS.

VEHICLE-SPRING.

963,870.

Specification of Letters Patent. Patented July 12, 1910.

Application filed June 25, 1909. Serial No. 504,280.

*To all whom it may concern:*

Be it known that I, DORR R. CLOSE, a citizen of the United States, residing at Chicago, in the county of Cook and State of Illinois, have invented certain new and useful Improvements in Vehicle - Springs, of which the following is a specification.

My invention relates to improvements in vehicle springs, and has for its general object to provide an easy riding, dampered, and non-side-swinging spring structure of a type involving two parti-elliptical spring members, and a coiled spring interposed therebetween.

Spring structures have heretofore been proposed embodying upper and lower parti-elliptical springs having interposed between their contiguous ends pliant coiled springs, but such constructions have been disadvantageous in practice on account of the side motion permitted by the laterally-flexible connection between the parti - elliptical spring elements and on account of liability of the spring to continuing motion or "teetering" resulting from undampered recoil.

My present invention provides a spring construction in which the parti-elliptical springs have interposed therebetween a compression spiral spring for taking up minor vibrations in conjunction with a simple, efficient, durable, and economical arrangement for avoiding undue recoil and preventing side motion between the parti-elliptical elements of the spring and consequently between the associated vehicle parts.

In the drawings, Figure 1 is a side elevation of a "three-quarters elliptical" spring structure embodying my invention; Fig. 2 shows a "full elliptical" structure embodying my invention; Fig. 3 is a section on line 3—3 of Fig. 1.

Referring to Fig. 1, A indicates a portion of a vehicle body such as a frame member and B a portion of a running gear such as an axle to be connected to the frame member by a spring structure. 5 indicates an upper parti-elliptical leaf spring structure and 6 a lower parti-elliptical leaf spring structure, the two springs being disposed one above the other. The only substantial difference between the constructions shown in Figs. 1 and 2 is that the upper parti-elliptical structure in Fig. 1 is only a quarter of an ellipse whereas the structure shown in Fig. 2 is a semi-ellipse, both forms of spring being well known in automobile construction. Between the extremity of the lower leaf spring structure 6 and the vertically registering portion of the upper spring 5 is interposed a coiled spring 7 having its ends, on opposite sides of its vertical axis, turned up into eyes 8, 8', to be secured to bolts 9, 9', passing through eyes 10, 10', formed in inner and confronting leaves, at the extremity of the normal span of the parti-elliptical springs. One of the parti-elliptical springs, preferably the upper one, has an integral scroll extension, passing beyond and free from the coiled spring 7 and preferably below the position of horizontal alinement with the extremity of the opposite parti-elliptical spring, such scroll portion being shown at 11.

The extremity of the leaf extension 11 is preferably curled back upon itself and formed into an eye 12 slightly below the horizontal plane of the eye 10', and a connection substantially rigid in a lateral direction is effected between the extremity of said scroll 11 and the extremity of the opposite parti-elliptical spring, as by means of a pair of swinging rigid links 13—13, connected at their inner extremities to the bolts 9', carried by the ends of leaf spring 6 and at their outer ends connected to the bolt 14, carried by the eye 12 in the extremity of the scroll.

The spring element having the scroll extension should be relatively stiff through its span to the point of connection with the coiled spring, while the coil and opposing leaf spring part are relatively pliant.

Under a shock, the load superposed upon the upper parti-elliptical spring, 5 or 5', and resisted by the support B of the lower spring 6, tends to compress the coiled spring 7 and flatten out and elongate the relatively pliant lower leaf spring structure 6, the upper spring 5 within its supporting span receiving very little deflection. Such action tends to bring the outer extremities of the links 13 downward about the same distance that the end of the lower spring 6 travels, resulting in but little angular deflection of the link 13. Upon the recoil, however, the tendency of the spring 6 to so rebound as to throw its extremity upward and inward through a large arc is resisted by the pull of the link 13 against the scroll, so that the recoil action of the spring is effectively dampered and "teetering" or continuing vibration of the spring structure prevented. The action of the links, furthermore, is to make the connection between the upper and lower leaf spring structures laterally substantially rigid, and effectually to prevent side swinging of the spring members relatively to each other under all conditions of operation.

While I have herein described in some detail a specific construction embodying my invention, I do not desire to be understood as limiting the invention to the precise organization further than as set forth in the following claims.

What I claim is:

1. A vehicle spring structure comprising in combination two parti-elliptical springs, a coiled spring interposed between vertically substantially alining portions of said springs, a scroll extension of one of said leaf springs extending beyond the end of the other, and means for checking the recoil of the said second member comprising a substantially laterally rigid connection between the scroll portion and the end of the opposite leaf spring to which the coiled spring is connected.

2. In a vehicle spring construction comprising two parti-elliptical springs, eyes in substantially vertical alinement therein, a coiled spring interposed between and connected with said eyes, a scroll extension upon the end of one spring, and a substantially laterally-rigid connection between the end of said scroll extension and the eye on the opposite spring to which the coiled spring is connected.

3. In a vehicle spring structure, two opposite parti-elliptical springs having substantially vertically alining eyes, one of said springs being relatively stiff, and the other relatively pliant, a compression coiled spring interposed between said eyes, a scroll extension projecting from the stiffer of said parti-elliptical springs outside of the coil and beyond the eye of the opposite relatively pliant spring, and a stiff swinging link connecting the extremity of said scroll and the eye of the opposite spring, an arrangement permitting straightening of the more pliant spring under a shock, and acting with the scroll, upon the recoil, to tend to damper the recoil action, and thereby to prevent "teetering" of the spring structure.

4. A vehicle spring structure comprising two parti-elliptical springs one above the other, a coiled spring interposed between the end of the lower of said springs and a substantially vertically alining portion of the upper spring, said upper spring having a scroll extension extending to a point beyond and slightly below said end of the lower spring, and a link connection between the end of said scroll extension and the end of the lower spring.

In testimony whereof I hereunto set my hand in the presence of two witnesses.

DORR R. CLOSE.

In the presence of—
W. LINA ALLEN,
MARY F. ALLEN.